(12) United States Patent
Yamada

(10) Patent No.: US 7,842,213 B2
(45) Date of Patent: Nov. 30, 2010

(54) DIE FOR EXTRUSION-MOLDING AND METHOD FOR MANUFACTURING POROUS CERAMIC MEMBER

(75) Inventor: Takehisa Yamada, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 499 days.

(21) Appl. No.: 11/541,724

(22) Filed: Oct. 3, 2006

(65) Prior Publication Data
US 2007/0085233 A1    Apr. 19, 2007

(30) Foreign Application Priority Data

Oct. 5, 2005   (JP)  ............................... 2005-292367
Aug. 17, 2006   (WO)  ................. PCT/JP2006/316178

(51) Int. Cl.
*B29C 47/00*     (2006.01)

(52) U.S. Cl. ................................. 264/177.12; 425/461

(58) Field of Classification Search ............ 264/177.12; 425/461
See application file for complete search history.

(56) References Cited

U.S. PATENT DOCUMENTS

| | | | | |
|---|---|---|---|---|
| 4,478,564 | A | * | 10/1984 | Shinmoto ................... 425/72.1 |
| 4,741,792 | A | * | 5/1988 | Matsuhisa et al. ......... 156/89.22 |
| 4,810,458 | A | * | 3/1989 | Oshima et al. .............. 264/555 |
| 4,814,187 | A | * | 3/1989 | Inoue et al. .................. 425/464 |
| 5,914,187 | A | | 6/1999 | Naruse et al. |
| 6,193,497 | B1 | | 2/2001 | Suzuki |
| 6,669,751 | B1 | | 12/2003 | Ohno et al. |
| 7,112,233 | B2 | | 9/2006 | Ohno et al. |

(Continued)

FOREIGN PATENT DOCUMENTS

DE    198 10 076 A1    10/1998

(Continued)

OTHER PUBLICATIONS

Machine translations of: JP 2000-326318.*

(Continued)

*Primary Examiner*—Joseph S Del Sole
*Assistant Examiner*—Kimberly A Stewart
(74) *Attorney, Agent, or Firm*—Finnegan, Henderson, Farabow, Garrett & Dunner, LLP

(57) ABSTRACT

A die for extrusion-molding in accordance with the present invention comprises: a molding groove part, a material supplying part, and an outer frame for fixing a die main body comprising the molding groove part and the material supplying part to the front end of an extrusion-molding apparatus, wherein
 the die main body has a form in which the plate-shaped molding groove part smaller than the material supplying part is provided at almost the middle of the plate-shaped material supplying part such that it protrudes from the material supplying part,
 the outer frame comprises: a die holding part which is provided such that it covers the material supplying part around the molding groove part; and a peripheral part which is provided near the die holding part, and
 supposing that the thickness of the molding groove part is X, the thickness of the material supplying part is Y, and the thickness of the die holding part of the outer frame is Z, these X, Y and Z are allowed to satisfy the inequalities (1) about $3 \leq X \leq$ about 6, (2) about $5 \leq Y \leq$ about 10, (3) about $3.5 \leq Z \leq$ about 8.5, (4) about $0.8 < Y/X <$ about 2.5, and (5) about $1 < Z/X <$ about 2.

16 Claims, 6 Drawing Sheets

U.S. PATENT DOCUMENTS

| | | | |
|---|---|---|---|
| 7,309,370 B2 | 12/2007 | Kudo et al. | |
| 7,311,510 B2 * | 12/2007 | Nate et al. | 425/380 |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,431,873 B2 * | 10/2008 | Nate et al. | 264/177.12 |
| 7,438,967 B2 | 10/2008 | Fujita | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |
| 2002/0185776 A1 | 12/2002 | Shibagaki et al. | |
| 2004/0161596 A1 | 8/2004 | Taoka et al. | |
| 2005/0109023 A1 | 5/2005 | Kudo et al. | |
| 2005/0147707 A1 * | 7/2005 | Nate et al. | 425/380 |
| 2005/0153099 A1 | 7/2005 | Yamada | |
| 2005/0167880 A1 * | 8/2005 | Nate et al. | 264/177.12 |
| 2005/0169819 A1 | 8/2005 | Shibata | |
| 2005/0175514 A1 | 8/2005 | Ohno | |
| 2005/0180898 A1 | 8/2005 | Yamada | |
| 2005/0247038 A1 | 11/2005 | Takahashi | |
| 2005/0272602 A1 | 12/2005 | Ninomiya | |
| 2006/0029897 A1 | 2/2006 | Saijo et al. | |
| 2006/0029898 A1 | 2/2006 | Saijo et al. | |
| 2006/0043562 A1 | 3/2006 | Watanabe | |
| 2006/0051556 A1 | 3/2006 | Ohno et al. | |
| 2006/0073970 A1 | 4/2006 | Yamada | |
| 2006/0108347 A1 | 5/2006 | Koyama et al. | |
| 2006/0118546 A1 | 6/2006 | Saijo | |
| 2006/0166820 A1 | 7/2006 | Ogyu et al. | |
| 2006/0210765 A1 | 9/2006 | Ohno et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0230732 A1 | 10/2006 | Kunieda | |
| 2006/0245465 A1 | 11/2006 | Saijo et al. | |
| 2006/0269722 A1 | 11/2006 | Yamada | |
| 2007/0020155 A1 | 1/2007 | Ohno et al. | |
| 2007/0028575 A1 | 2/2007 | Ohno et al. | |
| 2007/0044444 A1 | 3/2007 | Oshimi | |
| 2007/0068128 A1 | 3/2007 | Oshimi et al. | |
| 2007/0116908 A1 | 5/2007 | Ohno et al. | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0144561 A1 | 6/2007 | Saijo et al. | |
| 2007/0148403 A1 | 6/2007 | Yamamura et al. | |
| 2007/0152382 A1 | 7/2007 | Yamada et al. | |
| 2007/0169453 A1 | 7/2007 | Hayakawa | |
| 2007/0175060 A1 | 8/2007 | Idei et al. | |
| 2007/0178275 A1 | 8/2007 | Takahashi | |
| 2007/0187651 A1 | 8/2007 | Naruse et al. | |
| 2007/0190350 A1 | 8/2007 | Ohno et al. | |
| 2007/0196620 A1 | 8/2007 | Ohno et al. | |
| 2007/0199205 A1 | 8/2007 | Hoshino et al. | |
| 2007/0204580 A1 | 9/2007 | Kunieda | |
| 2007/0212517 A1 | 9/2007 | Ohno et al. | |
| 2007/0235895 A1 | 10/2007 | Yamamura et al. | |
| 2007/0243283 A1 | 10/2007 | Yamamura et al. | |
| 2007/0262498 A1 | 11/2007 | Saijo et al. | |
| 2007/0293392 A1 | 12/2007 | Ohno et al. | |
| 2008/0067725 A1 | 3/2008 | Naruse et al. | |
| 2008/0084010 A1 | 4/2008 | Naruse et al. | |
| 2008/0088072 A1 | 4/2008 | Kobayashi | |
| 2008/0106008 A1 | 5/2008 | Kasai et al. | |
| 2008/0106009 A1 | 5/2008 | Naruse et al. | |
| 2008/0120950 A1 | 5/2008 | Ohno et al. | |
| 2008/0136062 A1 | 6/2008 | Kasai et al. | |
| 2008/0138567 A1 | 6/2008 | Ninomiya et al. | |
| 2008/0174039 A1 | 7/2008 | Saijo et al. | |
| 2008/0190081 A1 | 8/2008 | Oshimi | |
| 2008/0190083 A1 | 8/2008 | Oshimi | |
| 2008/0213485 A1 | 9/2008 | Shibata | |
| 2008/0236115 A1 | 10/2008 | Sakashita | |
| 2008/0236122 A1 | 10/2008 | Ito | |
| 2008/0236724 A1 | 10/2008 | Higuchi | |
| 2008/0241015 A1 | 10/2008 | Kudo et al. | |
| 2008/0241444 A1 | 10/2008 | Oshimi | |
| 2008/0241466 A1 | 10/2008 | Saito et al. | |
| 2008/0284067 A1 | 11/2008 | Naruse et al. | |
| 2008/0305259 A1 | 12/2008 | Saijo | |
| 2008/0318001 A1 | 12/2008 | Sakakibara | |
| 2009/0004431 A1 | 1/2009 | Ninomiya | |

FOREIGN PATENT DOCUMENTS

| | | |
|---|---|---|
| EP | 1 500 479 A1 | 1/2005 |
| JP | 53-106711 | 9/1978 |
| JP | 61108508 | 5/1986 |
| JP | 05-131424 | 5/1993 |
| JP | 08-090534 | 4/1996 |
| JP | 08-336819 | 12/1996 |
| JP | 2002-283327 | 10/2002 |

OTHER PUBLICATIONS

Machine translations JP 05-131424, and JP 08-336819.*
Machine translation of JP 07-246610.*
Machine translation of JP 08-090534.*
Related case list.
U.S. Appl. No. 11/174,483, unpublished, Saijo et al.
U.S. Appl. No. 11/225,197.
U.S. Appl. No. 11/174,483.
European Search Report.
U.S. Appl. No. 11/925,350.
U.S. Appl. No. 11/927,046.
U.S. Appl. No. 11/931,935.
U.S. Appl. No. 11/845,975.
U.S. Appl. No. 11/867,256.
U.S. Appl. No. 11/963,381.
Summons to attend oral proceedings pursuant to Rule 115(1) EPC to be held Jan. 20, 2009 re European Application No. 06018111.2-1253, Aug. 20, 2008.
U.S. Appl. No. 11/695,246.
U.S. Appl. No. 11/749,961.
U.S. Appl. No. 11/748,099.
U.S. Appl. No. 11/746,895.
U.S. Appl. No. 11/513,115.
U.S. Appl. No. 11/762,928.
U.S. Appl. No. 11/765,088.
U.S. Appl. No. 11/546,417.
U.S. Appl. No. 11/711,021.
U.S. Appl. No. 11/951,949.

* cited by examiner

B-B line cross-sectional view

A-A line cross-sectional view

DIE FOR EXTRUSION-MOLDING AND METHOD FOR MANUFACTURING POROUS CERAMIC MEMBER

CROSS REFERENCE TO RELATED APPLICATIONS

This application claims priority of PCT/JP2006/316178 filed on Aug. 17, 2006, which claims priority of Japanese Patent Application No. 2005-292367 filed on Oct. 5, 2005. The contents of these applications are incorporated herein by reference in their entirety.

BACKGROUND OF THE INVENTION

1. Field of the Invention

The present invention relates to a die for extrusion-molding that is used upon manufacturing of a porous ceramic member, and a method for manufacturing a porous ceramic member using this die for extrusion-molding.

2. Discussion of the Background

Recently, particulate matters (hereinafter, referred to as PM) contained in exhaust gases that are discharged from internal combustion engines for vehicles such as a bus, a truck and the like, construction equipment and the like, have raised serious problems as contaminants harmful to the environment and the human body.

There have been proposed various types of ceramic filters for purifying exhaust gases in which such exhaust gases pass through a porous ceramic so that the PM in exhaust gases are captured.

The ceramic filter is normally configured such that a plurality of porous ceramic members 40 as shown in FIGS. 1A, 1B and 2 are combined with one another to form a ceramic filter 50. Further, as shown in FIGS. 1A and 1B, the porous ceramic member 40 has a large number of cells 41 placed in parallel with one another in the longitudinal direction so that partition walls 43 that separate the cells 41 are allowed to function as filters.

In other words, each of the cells 41 formed in the porous ceramic member 40 has either one of the end portions on the inlet side or the outlet side of exhaust gases sealed with a plug material layer 42 as shown in FIG. 1B so that exhaust gases that have flowed into one of the cells 41 are allowed to flow out of another cell 41 after surely having passed through the partition wall 43 that separates the cells 41. When exhaust gases pass through this partition wall 43, PM is captured at the partition wall 43 portion, and thereby the exhaust gases are purified.

Note that FIG. 1A is a perspective view that schematically shows one example of a porous ceramic member; and FIG. 1B is a cross-sectional view taken along line B-B of the porous ceramic member shown in FIG. 1A. Further, FIG. 2 is a perspective view that schematically shows one example of a ceramic filter.

Conventionally, upon manufacturing such a porous ceramic member 40, a ceramic molded body 5 shown in FIGS. 3A and 3B in which a large number of cells 6 are placed in parallel with one another in the longitudinal direction with a partition wall 7 therebetween has been produced at first by mixing a ceramic powder, a binder, a dispersant solution and the like to prepare a mixed composition for producing a molded body, and then charging the mixed composition into an extrusion-molding apparatus provided with a die for extrusion-molding and carrying out an extrusion-molding process and the like. FIG. 3A is a perspective view that schematically shows the ceramic molded body 5; and FIG. 3B is a cross-sectional view taken along line A-A of the ceramic molded body shown in FIG. 3A.

After the above-mentioned process, the obtained ceramic molded body 5 is dried by using a heater and the like, and thereafter a degreasing process for thermally decomposing organic matters such as a binder and the like in the ceramic molded body 5 and a firing process for firing the ceramic are carried out. The porous ceramic member 40 has thus been manufactured.

FIG. 4A is a cross-sectional view that schematically shows a conventional die for extrusion-molding; and FIG. 4B is a perspective view that schematically shows the manner in which a ceramic molded body is produced, using an extrusion-molding apparatus provided with the die for extrusion-molding.

FIG. 5A is an enlarged front view of a die main body that constitutes an embodiment of a die for extrusion-molding; and FIG. 5B is a rear view of the die main body.

As shown in FIG. 4B, an extrusion-molding apparatus 80 is provided with a die for extrusion-molding 60 at the front end of a casing 81, and a molded body 90 is formed by being continuously pushed out through the mold for extrusion-molding 60. A screw (not shown) is provided inside the casing 81, and by this screw the material composition is mixed up and the material composition is pushed into the mold for extrusion-molding 60 so that the molded body 90 in which a large number of cells are longitudinally placed in parallel with one another is continuously manufactured. Then, the molded body 90 which has been stretched out continuously is cut into a predetermined length so that the ceramic molded body 5 is formed.

As shown in FIG. 4A, the die for extrusion-molding 60 is provided with a die main body 68 comprising a material supplying part 65 and a molding groove part 61 that are formed integrally, and an outer frame 70 for supporting and fixing the die main body 68.

Further, as shown in FIG. 4A, in the material supplying part 65, material supplying holes 66 having a truncated cone shape are formed so that the mixed composition can pass through those holes. On the other hand, in the molding groove part 61, molding grooves 62 formed in a checkered pattern as shown in FIGS. 5A and 5B are formed so that the mixed composition which has passed through the material supplying holes 66 can be molded into the shape of the ceramic molded body 5.

That is, in this molding groove part 61, a large number of pillar-shaped parts 63 having a square pillar-shape are arranged in the direction exactly perpendicular to the paper surface of the figure, and under a state in which the pillar-shaped parts 63 are supported by the members constituting the material supplying part 65. As the mixed composition continuously passes through the molding grooves 62 that are formed through arranging those pillar-shaped parts 63, the molded body 90 is manufactured.

When the extrusion-molding process is carried out by using the extrusion-molding apparatus 80, the mixed composition is charged into the casing 81. The mixed composition is further kneaded inside the extrusion-molding apparatus 80 and pushed by a screw blade (not shown) so that the mixed composition gradually moves in the direction of the end portion, passes through the molding grooves 62 inside the die for extrusion-molding 60, and is extruded. Then, the extruded material is cut into a predetermined length so that the pillar-shaped ceramic molded body 5 in which a large number of cells 6 are longitudinally placed in parallel with one another with the partition wall 7 therebetween is manufactured.

JP-A 8-90534 discloses a die for molding honeycomb structures which basically has the above-mentioned constitution, and also has a constitution in which the material supplying holes of the respective material supplying parts extend toward the upstream end portions of the respective molding grooves, and the respective upstream end portions are provided with a reservoir having a cross-sectional area larger than the respective material supplying holes.

The contents of JP-A 8-90534 are incorporated herein by reference in their entirety.

SUMMARY OF THE INVENTION

A die for extrusion-molding in accordance with the present invention is a die for extrusion-molding comprising: a molding groove part provided with at least one or more molding grooves; a material supplying part for supplying a material to the molding groove part; and an outer frame for fixing a die main body which comprises the molding groove part and the material supplying part to the front end of an extrusion-molding apparatus, wherein the die main body has a form in which the molding groove part which has a plate-shaped appearance and is smaller than the material supplying part is provided at almost the middle of the material supplying part having a plate-shaped appearance such that it protrudes from the material supplying part, the outer frame comprises: a die holding part which is provided such that it covers the material supplying part around the molding groove part; and a peripheral part which is provided near the die holding part, and supposing that the thickness of the molding groove part is X, the thickness of the material supplying part is Y, and the thickness of the die holding part of the outer frame is Z, these X, Y and Z are allowed to satisfy the following inequalities (1) to (5):

$$\text{about 3 (mm)} \leq X \leq \text{about 6 (mm)} \tag{1},$$

$$\text{about 5 (mm)} \leq Y \leq \text{about 10 (mm)} \tag{2},$$

$$\text{about 3.5 (mm)} \leq Z \leq \text{about 8.5 (mm)} \tag{3},$$

$$\text{about } 0.8 < Y/X < \text{about 2.5} \tag{4}, \text{ and}$$

$$\text{about } 1 < Z/X < \text{about 2} \tag{5}.$$

In the die for extrusion-molding of the present invention, the area of the portion where the molded body is to be pushed out is desirably at least about 900 mm$^2$ and at most about 1600 mm$^2$.

Moreover, in the die for extrusion-molding of the present invention, the distance between the inner walls of the molding groove is desirably at least about 0.20 mm and at most about 0.40 mm.

Furthermore, in the die for extrusion-molding of the present invention, the number of grooves provided in 100 mm$^2$ of the molding groove part is desirably at least about 3 grooves and at most about 6 grooves.

A method for manufacturing a porous ceramic member in accordance with the present invention is a method for manufacturing a porous ceramic member for manufacturing a porous ceramic member in which a plurality of cells are placed in parallel with one another in the longitudinal direction with a partition wall therebetween, by using a die for extrusion-molding comprising:

a molding groove part provided with at least one or more molding grooves;

a material supplying part for supplying a material to the molding groove part; and an outer frame for fixing a die main body which comprises the molding groove part and the material supplying part to the front end of an extrusion-molding apparatus, wherein the die main body has a form in which the molding groove part which has a plate-shaped appearance and is smaller than the material supplying part is provided at almost the middle of the material supplying part having a plate-shaped appearance such that it protrudes from the material supplying part, the outer frame comprises:

a die holding part which is provided such that it covers the material supplying part around the molding groove part; and a peripheral part which is provided near the die holding part, and supposing that the thickness of the molding groove part is X, the thickness of the material supplying part is Y, and the thickness of the die holding part of the outer frame is Z, these X, Y and Z are allowed to satisfy the following inequalities (1) to (5):

$$\text{about 3 (mm)} \leq X \leq \text{about 6 (mm)} \tag{1},$$

$$\text{about 5 (mm)} \leq Y \leq \text{about 10 (mm)} \tag{2},$$

$$\text{about 3.5 (mm)} \leq Z \leq \text{about 8.5 (mm)} \tag{3},$$

$$\text{about } 0.8 < Y/X < \text{about 2.5} \tag{4}, \text{ and}$$

$$\text{about } 1 < Z/X < \text{about 2} \tag{5}.$$

In the method for manufacturing a porous ceramic member according to the present invention, the area of the portion where the molded body is to be pushed out is desirably at least about 900 mm$^2$ and at most about 1600 mm$^2$.

Moreover, in the method for manufacturing a porous ceramic member according to the present invention, the distance between the inner walls of the molding groove is desirably at least about 0.20 mm and at most about 0.40 mm.

Furthermore, in the method for manufacturing a porous ceramic member according to the present invention, the number of grooves provided in 100 mm$^2$ of the molding groove part 11 is desirably at least about 3 grooves and at most about 6 grooves.

DESCRIPTION OF THE EMBODIMENTS

Figure 1A:
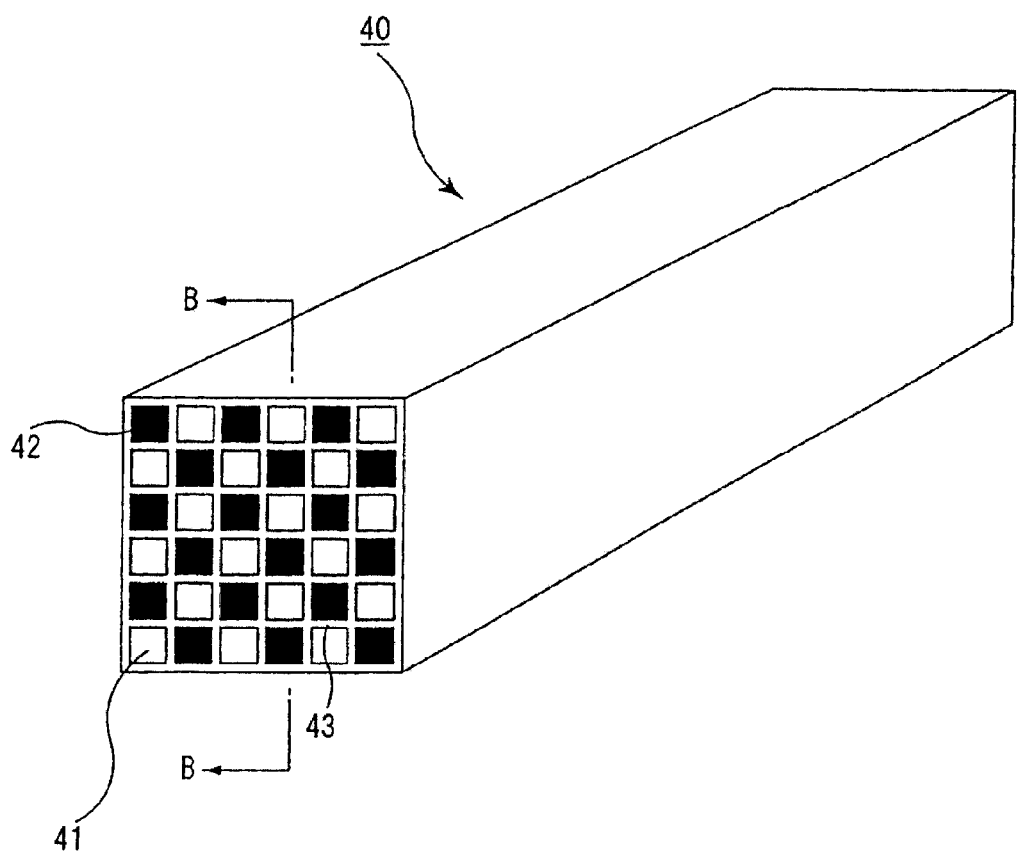
FIG. 1A is a perspective view that schematically shows one example of a porous ceramic member.

Hereinafter, referring to the drawings, the die for extrusion-molding according to the embodiments of the present invention, and the embodiments of the method for manufacturing a porous ceramic member using the die for extrusion-molding in accordance with the present invention will be described.

First, a die for extrusion-molding according to the embodiments of the present invention will be described.

The die for extrusion-molding according to the embodiments of the present invention is a die for extrusion-molding comprising:

a molding groove part provided with at least one or more molding grooves;

a material supplying part for supplying a material to the molding groove part; and an outer frame for fixing a die main body which comprises the molding groove part and the material supplying part to the front end of an extrusion-molding apparatus, wherein the die main body has a form in which the molding groove part which has a plate-shaped appearance and is smaller than the material supplying part is provided at almost the middle of the material supplying part having a plate-shaped appearance such that it protrudes from the material supplying part, the outer frame comprises: a die holding part which is provided such that it covers the material supplying part around the molding groove part; and a peripheral part which is provided near the die holding part, and supposing that the thickness of the molding groove part is X, the thickness of the material supplying part is Y, and the thickness of the die holding part of the outer frame is Z, these X, Y and Z are allowed to satisfy the following inequalities (1) to (5):

$$\text{about 3 (mm)} \leq X \leq \text{about 6 (mm)} \quad (1),$$

$$\text{about 5 (mm)} \leq Y \leq \text{about 10 (mm)} \quad (2),$$

$$\text{about 3.5 (mm)} \leq Z \leq \text{about 8.5 (mm)} \quad (3),$$

$$\text{about } 0.8 < Y/X < \text{about } 2.5 \quad (4), \text{ and}$$

$$\text{about } 1 < Z/X < \text{about } 2 \quad (5).$$

Figure 6A:
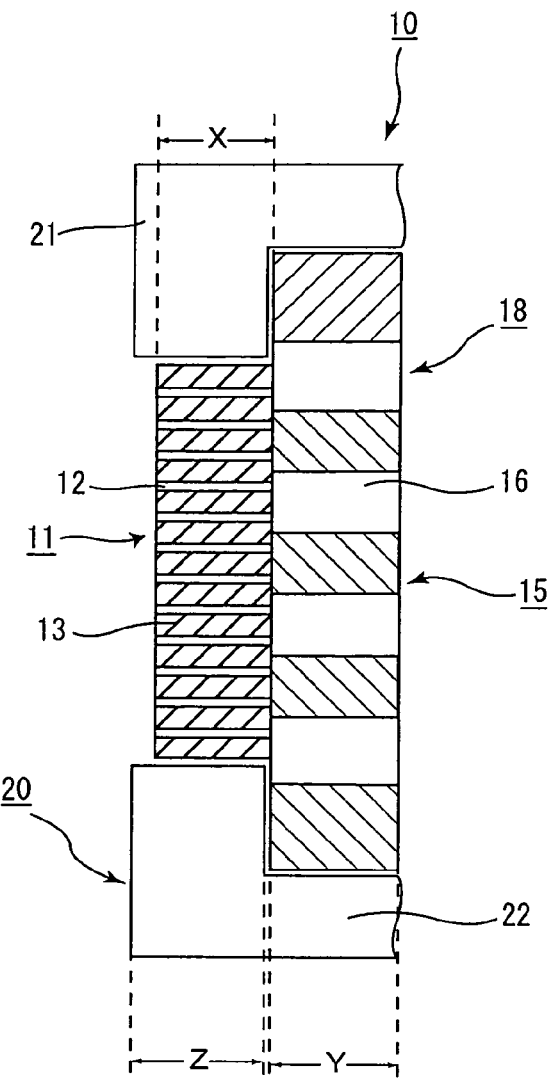
FIG. 6A is a cross-sectional view that schematically shows a part of the die for extrusion-molding according to one embodiment of the present invention.
Figure 6B:
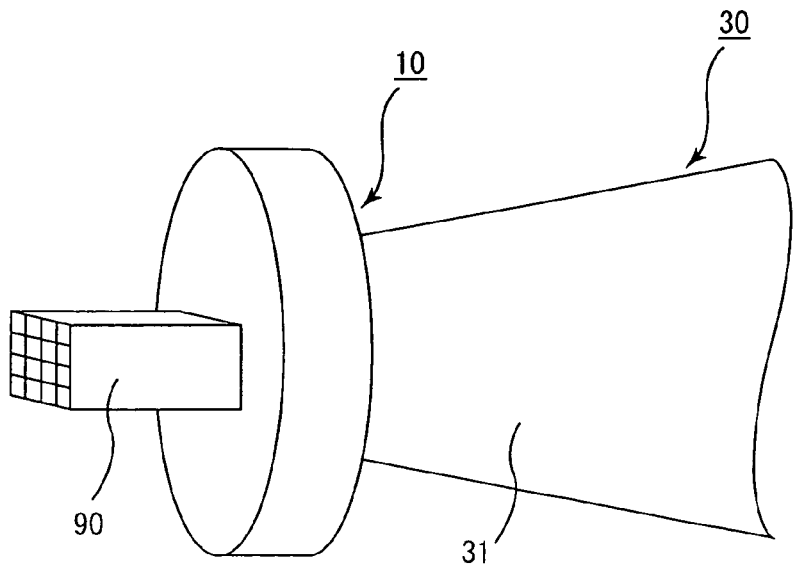
FIG. 6B is a perspective view that shows a front end portion of an extrusion-molding apparatus provided with the die for extrusion-molding according to the above-mentioned embodiment.

FIG. 6A is a cross-sectional view that schematically shows a part of the die for extrusion-molding according to one embodiment of the present invention; and FIG. 6B is a perspective view that shows a front end portion of an extrusion-molding apparatus provided with the die for extrusion-molding according to the above-mentioned embodiment.

In other words, as shown in FIG. 6A, a die for extrusion-molding 10 according to one embodiment of the present invention comprises: a molding groove part 11 provided with at least one or more molding grooves 12; a material supplying part 15 for supplying a material to the molding groove part 11; and an outer frame 20 for fixing a die main body 18 which comprises the molding groove part 11 and the material supplying part 15 to the front end of an extrusion-molding apparatus 30. Here, the die main body 18 has a form in which the molding groove part 11 which has a plate-shaped appearance and is smaller than the material supplying part 15 is provided at almost the middle of the material supplying part 15 having a plate-shaped appearance such that it protrudes from the material supplying part 15, and the outer frame 20 comprises:

a die holding part 21 which is provided such that it covers the material supplying part 15 around the molding groove part 11; and a peripheral part 22 which is provided near the die holding part 21.

In the material supplying part 15, material supplying holes 16 having a circular cylinder shape are formed so that the mixed composition can pass through those holes. On the other hand, in the molding groove part 11, molding grooves 12 formed in a checkered pattern are formed so that the mixed composition which has passed through the material supplying holes 16 can be molded into the shape of the ceramic molded body 5. That is, a large number of pillar-shaped parts 13 having a square pillar-shape are arranged under a state in which the pillar-shaped parts 13 are supported by the members constituting the material supplying part 15, and the space between the pillar-shaped parts 13 form the molding grooves 12.

In the die for extrusion-molding 10 according to the embodiment of the present invention, the thickness of respective members that constitute the die for extrusion-molding 10 is set as described below. That is, supposing that the thickness of the molding groove part 11 is X, the thickness of the material supplying part 15 is Y, and the thickness of the die holding part 21 of the outer frame 20 is Z, these X, Y and Z are allowed to satisfy the following inequalities (1) to (5):

$$\text{about 3 (mm)} \leq X \leq \text{about 6 (mm)} \quad (1),$$

$$\text{about 5 (mm)} \leq Y \leq \text{about 10 (mm)} \quad (2),$$

$$\text{about 3.5 (mm)} \leq Z \leq \text{about 8.5 (mm)} \quad (3),$$

$$\text{about } 0.8 < Y/X < \text{about } 2.5 \quad (4), \text{ and}$$

$$\text{about } 1 < Z/X < \text{about } 2 \quad (5).$$

The thickness X of the molding groove part 11 is set to at least about 3 mm and at most about 6 mm since the molding pressure may be able to be maintained in an appropriate range so that the molded body may be more easily formed into approximately a designed shape by setting the thickness X of the molding groove part 11 to at least about 3 mm and at most about 6 mm.

If the thickness X of the molding groove part 11 is about 3 mm or more, the thickness of the molding grove part 11 is less likely to be too thin, so that the shape of the molded body may be more easily formed into approximately the designed shape, and thus defects in the product tend not to occur. In contrast, the thickness X of the molding groove part 11 of about 6 mm or less may not require the molding pressure to be set high, so that it may become relatively easy to increase the molding speed, while in the case of the thickness X of the molding groove part 11 exceeding about 6 mm, when the molding speed is increased forcibly, the pressure applied to the casing 31, the die for extrusion-molding 10 and the like becomes high, readily causing various problems.

The thickness Y of the material supplying part 15 is set to at least about 5 mm and at most about 10 mm since the molding pressure may be able to be maintained in an appropriate range and the duration of the die for extrusion-molding tends to last for a long period by setting the thickness Y of the material supplying part 15 to at least about 5 mm and at most about 10 mm.

If the thickness Y of the material supplying part 15 is set to about 5 mm or more, the thickness Y of the material supplying part 15 may not become too thin so that the pressure applied to the molding groove part 11 tends not to become large, and thus the duration of the die for extrusion-molding tends not to be short. In contrast, the thickness Y of the material supplying part 15 of about 10 mm or less may not require the molding pressure to be set high, so that it may become relatively easy to increase the molding speed; while in the case where the thickness Y of the material supplying part 15 exceeds about 10 mm, when the molding speed is increased forcibly, the pressure applied to the casing 31, the die for extrusion-molding 10 and the like becomes high, readily causing various problems.

The thickness Z of the die holding part 21 is set to at least about 3.5 mm and at most about 8.5 mm so that it may become possible to prevent deformation, cracks and the like caused at the proximity of the peripheral portion of the molded body from being generated, and as a result, the duration of the die for extrusion-molding 10 may tend to last for a long period.

The thickness Z of the die holding part 21 of about 3.5 mm or more may be less likely to cause deformation of the die holding part 21; thus, the duration of the die for extrusion-molding 10 tends to become long. Further, the bonding strength at the proximity of the peripheral portion of the molded body may not tend to decrease, so that deformation, cracks and the like at the proximity of the peripheral portion may not tend to occur. In contrast, the thickness Z of the die holding part 21 exceeding about 8.5 mm does not particularly cause a serious problem; however, even though the thickness Z is further increased, the duration and the life of the die for extrusion-molding may not be improved. Thus, since increasing the thickness Z of the die holding part 21 is only economically disadvantageous, the thickness of about 8.5 mm or less is desirable.

The value of (thickness Y of the material supplying part 15/thickness X of the molding groove part 11) is set to about 0.8<Y/X<about 2.5 since the molding pressure may be able to be maintained in an appropriate range so that the shape of the molded body may be more easily formed into approximately a designed shape and the duration of the die for extrusion-molding may be able to last for a long period by setting Y/X to about 0.8<Y/X<about 2.5.

In the case where the value of Y/X is set to about 0.8 or less, when the thickness Y of the material supplying part 15 is too small (thin), the duration of the die for extrusion-molding 10 may tend to become short, and if the thickness X of the molding groove part 11 is too large, the molding pressure is to be set to a high pressure such that it may tend to become difficult to increase the molding speed.

In contrast, in the case where the value of Y/X is set to about 2.5 or more, if the thickness Y of the material supplying part 15 is too large (thick), the molding pressure is to be set to a high pressure, and if the thickness X of the molding groove part 11 is too small, there may be the case where the shape of the molded body may not be the designed shape.

The value of (thickness Z of the die holding part 21/thickness X of the molding groove part 11) is set to about 1<Z/X<about 2 since deformation, cracks and the like caused at the proximity of the peripheral portion of the molded body may tend to be prevented from being generated by setting Z/X to about 1<Z/X<about 2.

The value of Z/X set to about 1 or less tends to decrease the bonding strength at the proximity of the peripheral portion of the molded body such that the peripheral portion is not readily formed, and cracks and the like tend to occur easily. The value of Z/X set to about 2 or more tends to cause difficulty for the peripheral portion of the molded body to separate from the outer frame such that cracks tend to be caused easily.

The material of the die for extrusion-molding 10 is not particularly limited, and examples thereof include a tool steel, a tool steel for hot-working, and a hard metal.

Further, the area of the portion where the molded body is to be pushed out from the die for extrusion-molding 10 is preferably at least about 900 mm$^2$ and at most about 1600 mm$^2$ (at least about 30 mm and at most about 40 mm in diameter), and the distance between the inner walls of the molding groove 12 is preferably at least about 0.20 mm and at most about 0.40 mm. The number of grooves provided in 100 mm$^2$ of the molding groove part 11 is preferably at least about 3 grooves and at most about 6 grooves (the total number of grooves in the lengthwise and crosswise directions).

In the die for extrusion-molding according to the embodiments of the present invention, the thickness of each molding groove part, material supplying part and die holding part of the outer frame, all of which constitute the die for extrusion-molding, is set to satisfy the above-mentioned inequalities (1) to (5), therefore, upon manufacturing the molded body through the extrusion-molding method, it may become possible to manufacture the molded body efficiently at high speed, and the duration of the die for extrusion-molding tends to last for a long period, and in addition, it may become possible to manufacture a molded body in which cracks, deformation and the like are not present and thus defective products are less likely to be generated.

By using such a die for extrusion-molding, the molded body may be more easily manufactured efficiently at high speed, and the duration of the die for extrusion-molding tends to last for a long period, and in addition, it may become possible to manufacture a molded body in which cracks, deformation and the like are not present, and thus defective products are less likely to be generated.

The die for extrusion-molding in accordance with the present invention may of course be able to be suitably used for the manufacturing of ceramic molded bodies, and in addition, may be able to be used for materials that can be manufactured through extrusion-molding of resin, rubber and the like, for example.

In the die for extrusion-molding according to the embodiments of the present invention, even if the thickness of the material supplying part is not made large (14.5 mm, for example), the molding speed can be increased by setting the molding pressure to be the same as that in the normal condition (without increasing to be larger than normal). Also, the problem of difficulty in separating the peripheral wall of the molded body to be pushed out from the outer frame, which tends to cause cracks, may be less likely to occur.

Next, embodiments of a method for manufacturing a porous ceramic member according to the embodiments of the present invention will be described.

The method for manufacturing a porous ceramic member according to the embodiments of the present invention is a method for manufacturing a porous ceramic member comprising: using the die for extrusion-molding according to the embodiments of the present invention as mentioned above; and manufacturing a porous ceramic member in which a number of cells are longitudinally placed in parallel with one another with a partition wall therebetween.

Hereinafter, the method for manufacturing a porous ceramic member according to the embodiments of the present invention will be described in the order of its process.

(1) In the method for manufacturing in accordance with the present invention, first, a material paste is prepared.

The material paste is not particularly limited, and for example, a paste in which a binder, a dispersant solution and the like are added to a ceramic powder, the result being mixed by an attritor or the like, and sufficiently being kneaded by a kneader or the like, may be used.

Here, the above-mentioned ceramic powder may be selected according to the constituent material of the porous ceramic member to be manufactured.

As for the main component of the constituent material of the porous ceramic member, for example, nitride ceramics such as aluminum nitride, silicon nitride, boron nitride and titanium nitride; carbide ceramics such as silicon carbide, zirconium carbide, titanium carbide, tantalum carbide and tungsten carbide; and oxide ceramics such as alumina, zirconia, cordierite, mullite, silica and aluminum titanate, and the like may be used.

Here, as for the porous ceramic member a composite body of silicon and silicon carbide may be used. In the case where the composite body of silicon and silicon carbide is used, silicon is desirably added thereto to make up to at least about 0% and at most about 45% by weight of the entire body.

With respect to main component of the constituent material of the porous ceramic member, a silicon carbide-based ceramic that is superior in heat resistance and mechanical characteristics, and has a high thermal conductivity, is desirably used. Further, the silicon carbide-based ceramic refers to a material having a silicon carbide content of about 60% by weight or more.

With respect the particle diameter of the ceramic powder, although not particularly limited, those which are less susceptible to shrinkage in the succeeding firing process are desirably used, and for example, those powders, prepared by combining 100 parts by weight of powders having an average particle diameter of at least about 3 and at most about 70 µm with at least about 5 parts by weight and at most about 65 parts by weight of powders having an average particle diameter of at least about 0.1 µm and at most about 1.0 µm, are preferably used.

Here, the ceramic powder may be subjected to an oxidizing treatment.

The above-mentioned binder is not particularly limited, and examples thereof include methyl cellulose, carboxymethyl cellulose, hydroxyethyl cellulose, polyethylene glycol and the like.

In general, the compounding amount of the above-mentioned binder is desirably set to at least about 1 part by weight and at most about 15 parts by weight with respect to 100 parts by weight of the ceramic powder.

The above-mentioned dispersant solution is not particularly limited, and examples thereof include an organic solvent such as benzene; alcohol such as methanol; water, and the like.

An appropriate amount of the above-mentioned dispersant solution is mixed to the material so that the viscosity of the material paste is set within a fixed range.

Moreover, a molding auxiliary may be added to the material paste, if necessary.

Examples of the molding auxiliary include, although not particularly limited, ethylene glycol, dextrin, fatty acid, fatty acid soap, polyvinyl alcohol and the like.

Moreover, if necessary, balloons that are fine hollow spheres comprising oxide-based ceramics, or a pore-forming agent such as spherical acrylic particles or graphite may be added to the above-mentioned material paste.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

Figure 3A:
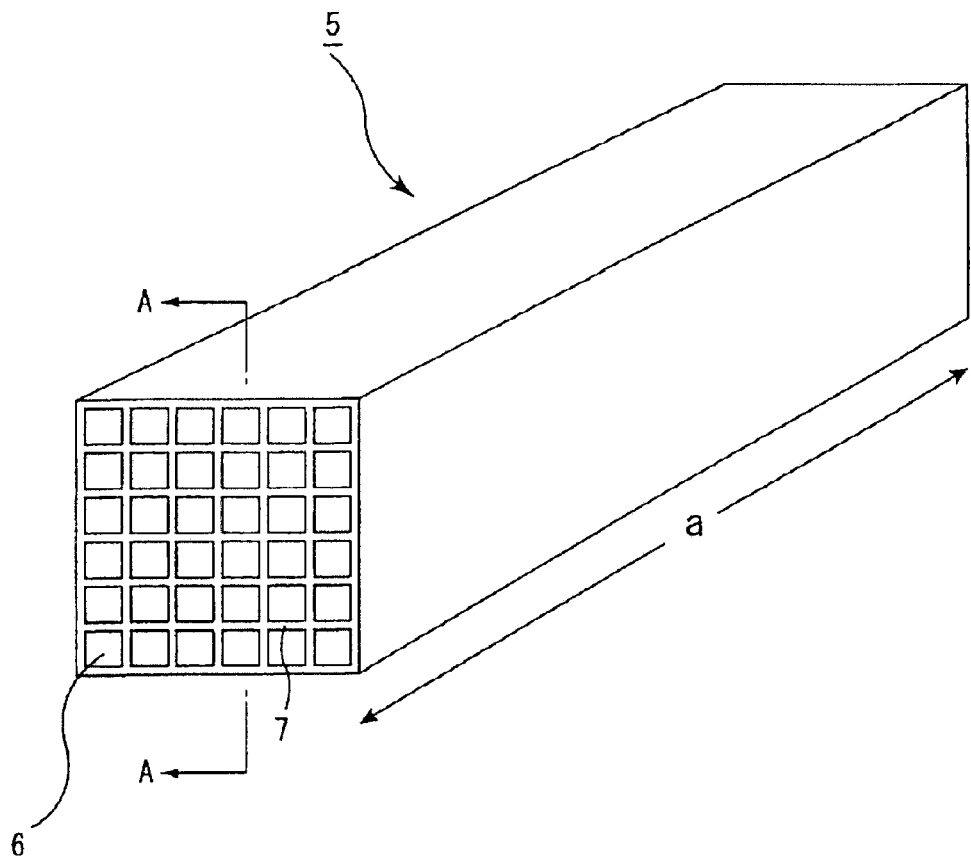
FIG. 3A is a perspective view that schematically shows a ceramic molded body.

(2) Next, the material paste is extrusion-molded so that the ceramic molded body 5 in which a large number of cells are placed in parallel with one another in the longitudinal direction (the direction shown by an arrow a in FIG. 3A) with a partition wall therebetween is manufactured.

In the method for manufacturing according to the embodiments of the present invention, the die for extrusion molding according to the embodiments of the present invention is used in this process. Therefore, it may become possible to manufacture a ceramic molded body 5 which is not a defective product efficiently at high speed.

(3) Next, the above-mentioned ceramic molded body is dried by using a microwave drier, a hot-air drier, a dielectric drier, a reduced-pressure drier, a vacuum drier, a freeze drier and the like so that a ceramic dried body is manufactured.

Thereafter, the ceramic dried body is subjected to degreasing (for example, at a temperature of at least about 200° C. and at most about 500° C.) and firing processes (for example, at a temperature of at least about 1400° C. and at most about 2300° C.) under predetermined conditions.

Here, with respect to the degreasing and firing conditions of the ceramic dried body, it is possible to apply conditions that have been conventionally used for manufacturing a filter made from porous ceramics.

With such a process, it may become possible to manufacture a porous ceramic member in which a plurality of cells are placed in parallel with one another in the longitudinal direction with a partition wall therebetween.

Figure 1B:
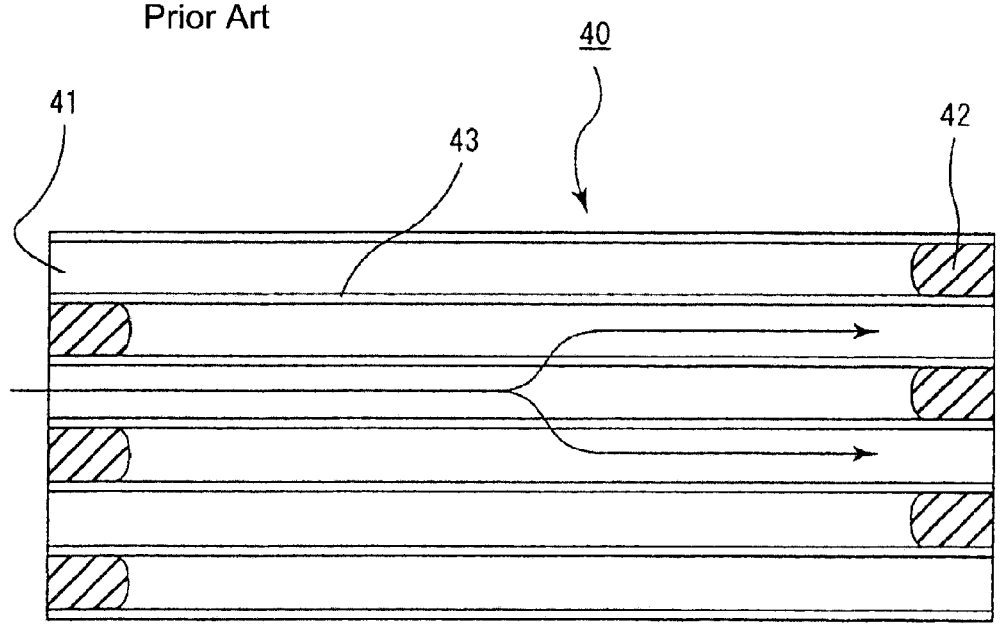
FIG. 1B is a cross-sectional view taken along line B-B of the porous ceramic member shown in FIG. 1A.

Moreover, in a case of manufacturing a porous ceramic member 40 as shown in FIGS. 1A and 1B in which either one of the end portions of the cell is sealed, in the method for manufacturing in accordance with the present invention, after the drying process in the above-mentioned process (3), a predetermined amount of plug material paste, which forms plugs, is injected into the predetermined end portions of the cells of the ceramic dried body so that the cells are sealed. Thereafter, the above-mentioned degreasing and firing processes are carried out so that the porous ceramic member 40 that is sealed on either one of the end portions of the cell may be able to be manufactured.

With respect to the plug material paste, although not particularly limited, the same paste as the above-mentioned material paste may be used, for example.

The porous ceramic member in which either one of the end portions of the cells is sealed may be able to be suitably used for a ceramic filter, while the porous ceramic member in which none of the end portions of the cells is sealed may be able to be suitably used for a catalyst supporting carrier.

Figure 2:
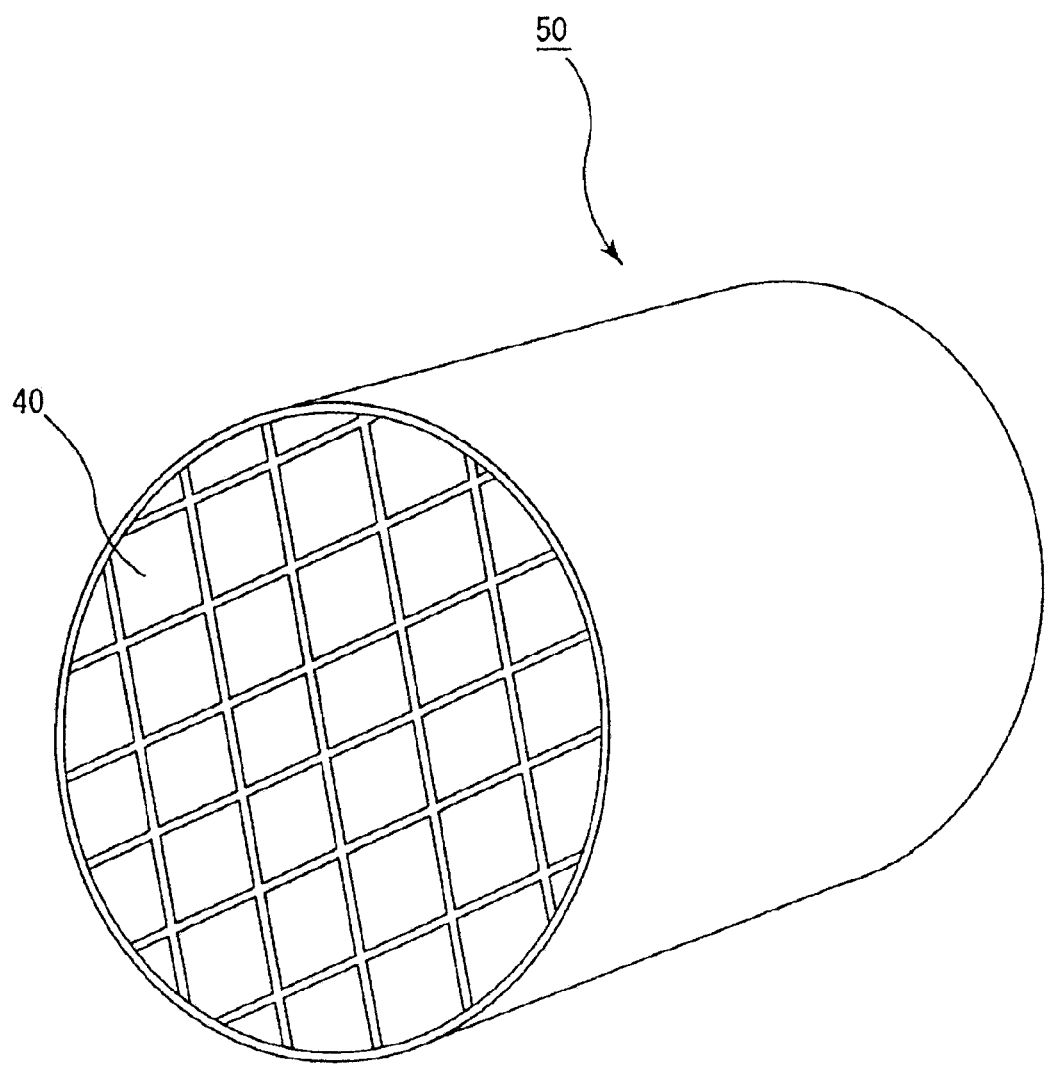
FIG. 2 is a perspective view that schematically shows one example of a ceramic filter.

Further, a plurality of the porous ceramic members which are manufactured through the method for manufacturing according to the embodiments of the present invention may be combined with one another so as to be able to be formed as a ceramic filter as shown in FIG. 2.

Here, a method for manufacturing a ceramic filter by using the porous ceramic member according to the above-mentioned embodiment will be briefly described.

First, an adhesive paste to form the adhesive layer is applied to each of the side faces of the porous ceramic member with an even thickness to form an adhesive paste layer, and by repeating a process for successively laminating another porous ceramic member on this adhesive paste layer, a porous ceramic member aggregated body having a predetermined size is manufactured.

Next, the porous ceramic member aggregated body is heated so that the adhesive paste layer is dried and solidified to form the adhesive layer.

Moreover, the porous ceramic member aggregated body in which a plurality of the porous ceramic members are bonded to one another by interposing the adhesive layers is subjected to a cutting process by using a diamond cutter and the like so that a ceramic block having a cylindrical shape is manufactured.

By forming a sealing material layer on the outer periphery of the honeycomb block by using the sealing material paste, it may become possible to manufacture a ceramic filter (see FIG. 2), in which the sealing material layer is formed on the peripheral portion of the cylindrical ceramic block formed by bonding a plurality of the porous ceramic members to one another by interposing the adhesive layers.

Examples of the material used for the adhesive paste include a material made from inorganic fibers and/or inorganic particles in addition to an inorganic binder and an organic binder, may be used.

Examples of the material to the above-mentioned inorganic binder include silica sol, alumina sol and the like. Each of these materials may be used alone, or two or more kinds of these may be used in combination. Of the above-mentioned inorganic binders, silica sol is more desirably used.

Examples of the organic binder include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

Examples of the inorganic fibers include ceramic fiber such as silica-alumina, mullite, alumina, silica and the like. Each of these may be used alone, or two or more kinds of these may be used in combination. Among the inorganic fibers, alumina fibers are more desirably used.

Examples of the inorganic particles include carbides, nitrides and the like, more specifically, inorganic powder or whisker, made from silicon carbide, silicon nitride, boron nitride and the like. Each of these may be used alone, or two or more kinds of these may be used in combination. Among the above-mentioned inorganic particles, silicon carbide, which is superior in thermal conductivity, is more desirably used.

Moreover, balloons that are fine hollow spheres comprising oxide-based ceramics and a pore-forming agent such as spherical acrylic particles or graphite may be added to the above-mentioned adhesive paste, if necessary.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

In addition, a plurality of porous ceramic members combined one another may be able to be formed as a catalyst supporting carrier.

The method for manufacturing a porous ceramic member according to the embodiments of the present invention uses the die for extrusion-molding according to the above-mentioned embodiments to manufacture a ceramic molded body; therefore, it may become possible to manufacture a porous ceramic member by using a ceramic molded body which is less likely to be a defective product, and thus it may become possible to efficiently manufacture a porous ceramic member having superior characteristics.

EXAMPLES

The following description will discuss the present invention in detail by means of examples; however, the present invention is not intended to be limited by these examples.

Examples 1 to 9

Comparative Examples 1 to 6

First, using a hard metal, the die for extrusion-molding 10 as shown in FIGS. 6A and 6B, which comprises the material supplying part, the molding groove part and the outer frame for fixing the die main body comprising the molding groove part and the material supplying part to the front end of the extrusion-molding apparatus, where the thickness X of the molding groove part, the thickness Y of the material supplying part, and the thickness Z of the die holding part of the outer frame were set to the values shown in Table 1-1, was manufactured.

Figure 3B:
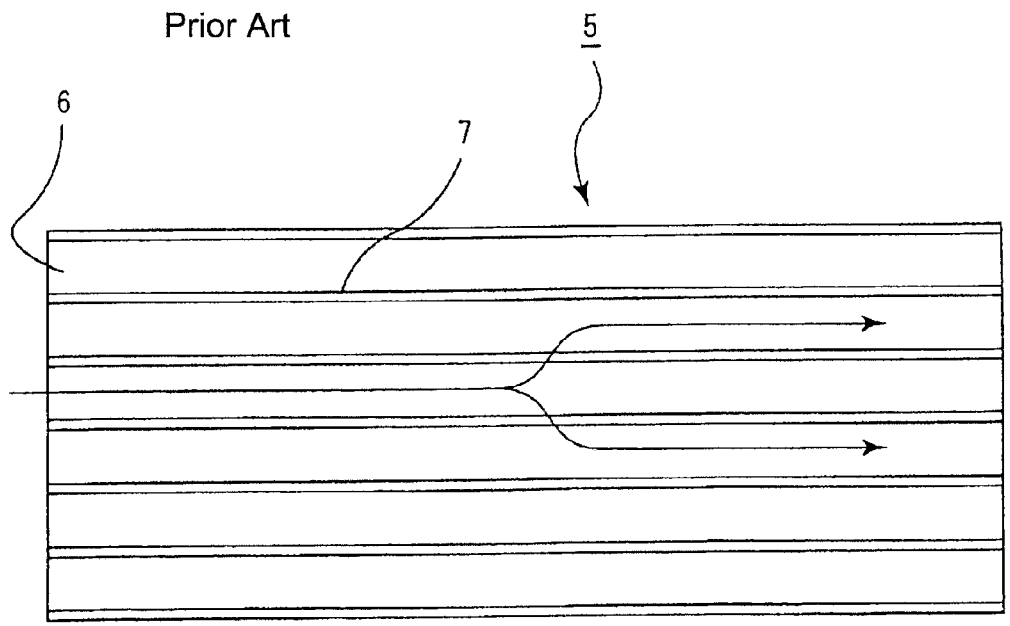
FIG. 3B is a cross-sectional view taken along line A-A of the ceramic molded body shown in FIG. 3A.
Figure 4A:
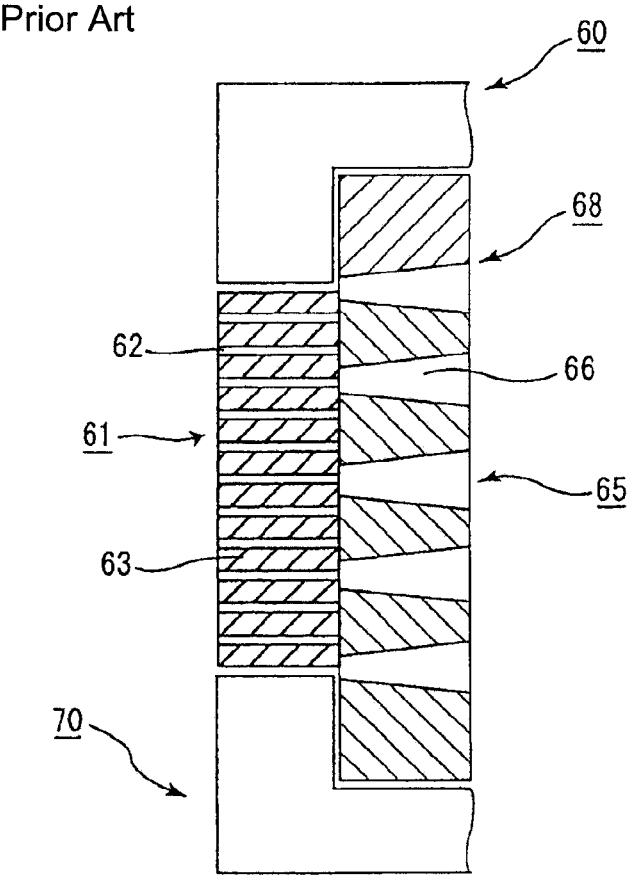
FIG. 4A is a cross-sectional view that schematically shows a conventional die for extrusion-molding.
Figure 4B:
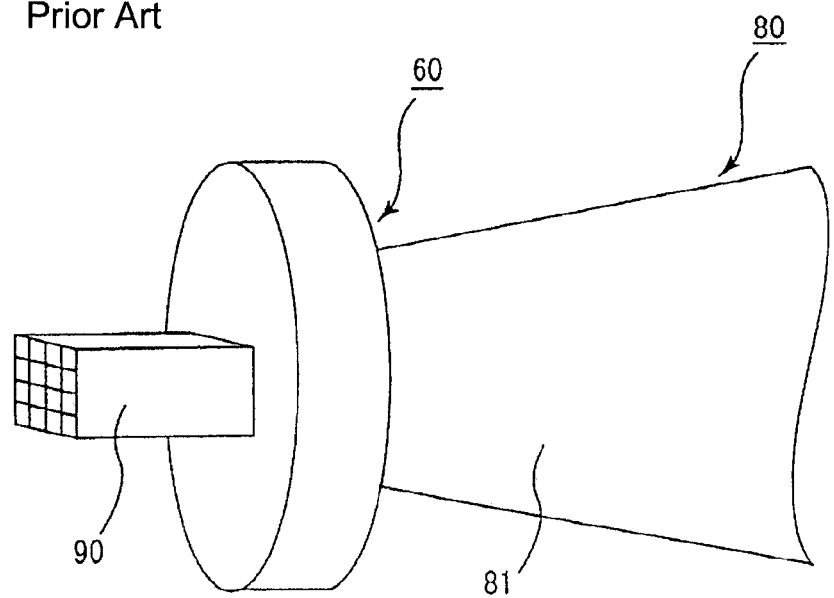
FIG. 4B is a perspective view that schematically shows the manner in which a ceramic molded body is manufactured, using an extrusion-molding apparatus provided with the die for extrusion-molding.
Figure 5A:
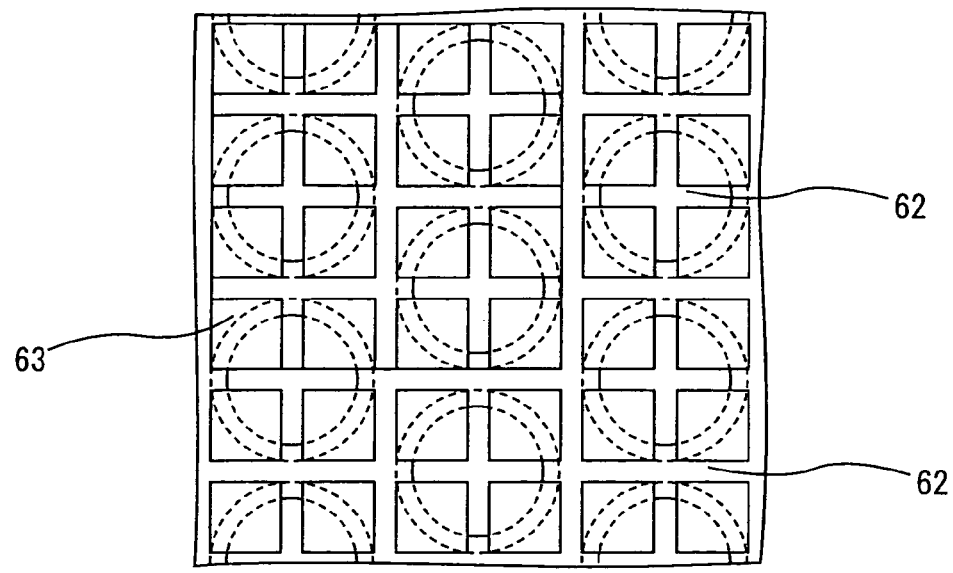
FIG. 5A is an enlarged front view of a die main body that constitutes an embodiment of a die for extrusion.
Figure 5B:
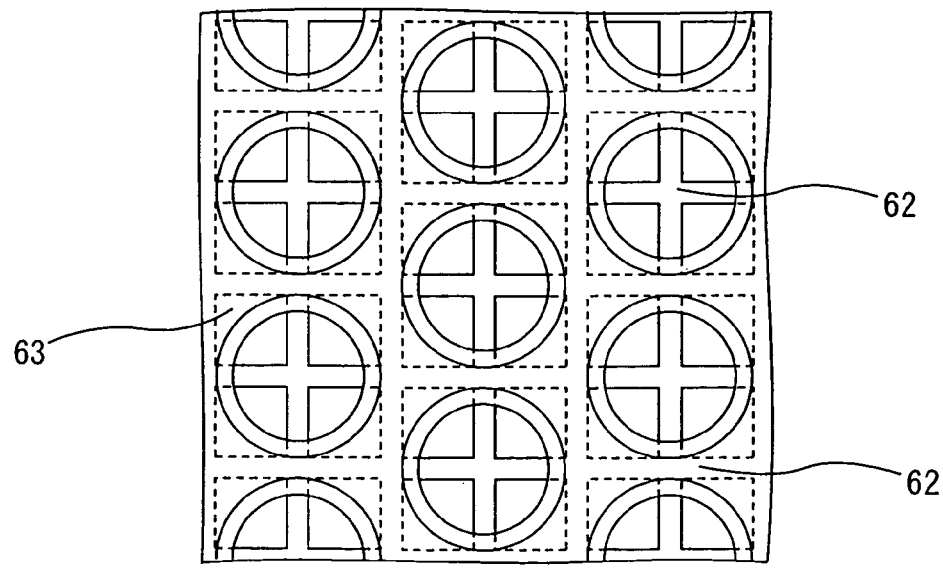
FIG. 5B is a rear view of the die main body.

Next, the die for extrusion molding 10 was fixed to the extrusion-molding apparatus 30 shown in FIG. 6B, and a mixed composition mainly composed of silicon carbide was charged into the extrusion-molding apparatus 30. By carrying out the extrusion-molding process continuously at the pressure shown in Table 1-1, the molded body 90 was continuously manufactured at the molding speed of 4000 mm/min, and thereafter, a cutting process was carried out so that the ceramic molded body 5 (see FIGS. 3A and 3B) in which a large number of cells 6 are longitudinally placed in parallel with one another with the partition wall 7 therebetween was manufactured.

The manufactured ceramic molded body 5 had a size of 34.3 mm×34.3 mm in the cross-section perpendicular to the longitudinal direction, the number of cells of 46.5 pcs/cm$^2$ and a thickness of the partition wall of 0.25 mm.

In the Examples and Comparative Examples, the mixed composition mainly composed of silicon carbide was used. The mixed composition was prepared through the following process: coarse powder of α-type silicon carbide having an average particle diameter of 22 μm (52.2% by weight) and fine powder of α-type silicon carbide having an average particle diameter of 0.5 μm (22.4% by weight) were wet-mixed, and to the resulting mixture were added 4.8% by weight of an acrylic resin, 2.6% by weight of an organic binder (methyl cellulose), 2.9% by weight of a plasticizer (UNILUBE made by NOF Corp.), 1.3% by weight of glycerin and 13.8% by weight of water, and kneaded.

TABLE 1-1

| | Thickness X of molding groove part (mm) | Thickness Y of material supplying part (mm) | Thickness Z of die holding part (mm) | Y/X | Z/X |
|---|---|---|---|---|---|
| Example 1 | 3 | 5 | 3.5 | 1.67 | 1.17 |
| Example 2 | 3 | 5 | 5.5 | 1.67 | 1.83 |
| Example 3 | 3 | 7 | 3.5 | 2.33 | 1.17 |
| Example 4 | 4 | 5 | 4.5 | 1.25 | 1.13 |
| Example 5 | 4 | 5 | 5.5 | 1.25 | 1.38 |
| Example 6 | 4 | 7 | 4.5 | 1.75 | 1.13 |
| Example 7 | 6 | 5 | 6.5 | 0.83 | 1.08 |
| Example 8 | 6 | 5 | 8.5 | 0.83 | 1.42 |
| Example 9 | 6 | 10 | 6.5 | 1.67 | 1.08 |
| Comparative Example 1 | 2 | 5 | 3.5 | 2.50 | 1.75 |
| Comparative Example 2 | 3 | 5 | 6.0 | 1.67 | 2.00 |
| Comparative Example 3 | 4 | 3 | 4.5 | 0.75 | 1.13 |
| Comparative Example 4 | 4 | 7 | 8.0 | 1.75 | 2.00 |
| Comparative | 8 | 6 | 8.5 | 0.75 | 1.06 |

TABLE 1-1-continued

|  | Thickness X of molding groove part (mm) | Thickness Y of material supplying part (mm) | Thickness Z of die holding part (mm) | Y/X | Z/X |
|---|---|---|---|---|---|
| Example 5 Comparative Example 6 | 8 | 7 | 8.5 | 0.88 | 1.06 |

In the present Examples and Comparative Examples, first, a dimensional deviation (rate of deviation of the dimension of the actual molded product from the design dimension) immediately after starting of the extrusion-molding was measured. The results were as shown in Table 1-2.

Next, under the conditions mentioned above, the extrusion-molding process was carried out continuously until the die for extrusion-molding was damaged, or the dimensional deviation of the molded body exceeded a predetermined rate (1.5% in the Examples, 2.0% in the Comparative Examples). The length of time until occurrence of such defects was referred to as a duration time allowed for using the die. The results were as shown in Table 1-2.

TABLE 1-2

|  | Pressure (MPa) | dimensional deviation (%) | Duration time allowed for using die (hr) | Cause for the die becoming unusable |
|---|---|---|---|---|
| Example 1 | 6.9 | <1.5 | 1500 | Cracks in outer frame |
| Example 2 | 7.1 | <1.5 | 1500 | Cracks in outer frame |
| Example 3 | 7.2 | <1.0 | 2000 | Cracks in outer frame |
| Example 4 | 7.2 | <1.0 | 2000 | Cracks in outer frame |
| Example 5 | 7.3 | <1.0 | 2000 | Cracks in outer frame |
| Example 6 | 7.4 | <1.0 | 2000 | Cracks in outer frame |
| Example 7 | 7.9 | <1.5 | 1500 | Wear by abrasion |
| Example 8 | 8.2 | <1.5 | 1500 | Wear by abrasion |
| Example 9 | 8.6 | <1.5 | 1500 | Wear by abrasion |
| Comparative Example 1 | 6.8 | 2.0< | 0 | Difficulty in molding |
| Comparative Example 2 | 7.2 | 2.0< | 0 | Difficulty in molding |
| Comparative Example 3 | 6.4 | <1.0 | 1000 | Cracks in material supplying part |
| Comparative Example 4 | 7.7 | 1.5 to 2.0 | 1000 | Wear by abrasion |
| Comparative Example 5 | 8.8 | 1.5 to 2.0 | 1000 | Wear by abrasion |
| Comparative Example 6 | 9.0 | 1.5 to 2.0 | 1000 | Wear by abrasion |

Note)
The pressure, dimensional deviation, duration time allowed for using die and the cause for the die becoming unusable shown in the Tables are data obtained upon molding at a molding speed of 4000 mm/min.

With respect to the dimensional deviation, as clearly indicated in the results shown in Table 1-2, in the extrusion-molding process in accordance with the Examples, a preferable dimensional accuracy such as the dimensional deviation of less than 1.5% or less than 1.0%, was achieved.

In contrast, in the extrusion-molding process in accordance with the Comparative Examples 1 and 2, the dimensional deviation exceeded 2%, and thereby it was difficult to form a ceramic molded body having a predetermined shape. The reason for such defects may have been caused because the value of Y/X and Z/X were too large.

In the extrusion-molding process in accordance with the Comparative Example 3, a ceramic molded body which was low in dimensional deviation was formed.

In the extrusion-molding process in accordance with the Comparative Examples 4 to 6, ceramic molded bodies having the dimensional deviation in the range of 1.5 to 2.0% was formed; however, the dimensional accuracy was lower than the dimensional accuracy of the extrusion-molding process in accordance with the Examples.

Furthermore, with respect to the duration time allowed for using the die, as indicated in the results shown in Table 1-2, in the extrusion-molding process in accordance with the Examples, a preferable result was obtained such that the die could be used for a period as long as 1500 hours or more.

In contrast, as described above, the extrusion-molding process in accordance with the Comparative Examples 1 and 2 had a poor dimensional accuracy from immediately after starting of the extrusion-molding such that it was difficult to form a ceramic molded body having a predetermined shape; thus, the duration time allowed for using the die was zero hour.

In the extrusion-molding process in accordance with the Comparative Example 3, the dimensional accuracy was at a preferable rate; however, the duration time allowed for using the die was short in that cracks were caused in the material supplying part after 1000 hours had elapsed. The reason for this is presumably because the value of Y and Y/X were too small.

In the extrusion-molding process in accordance with the Comparative Examples 4 to 6, as is already described, the dimensional accuracy was lower than the dimensional accuracy of the extrusion-molding process in accordance with the Examples, and in addition, the dimensional deviation exceeded 2% in 1000 hours due to wear in the die. Thus, the duration time allowed for using the die was a short period. The reason for this is presumably because the value of Z/X was too large (Comparative Example 4), the value of Y/X was too small (Comparative Example 5), and the value of X was too large (Comparative Examples 5 and 6).

Although, Table 1-2 shows the results of the cases where the molding speed was fixed, it may be presumed that almost the same results are obtained even if the molding conditions such as molding speed are changed.

Consequently, it became clear that, in the die for extrusion-molding in accordance with the present invention in which the respective components are provided so as to satisfy the above mentioned inequalities (1) to (5), the duration of the die for extrusion-molding may be able to last for a long period, and also it may become possible to manufacture a molded body in which cracks, deformation and the like are not present, it may become possible to manufacture a molded body in which cracks, deformation and the like are not present, and the defective products are not generated.

What is claimed as new and desired to be secured by Letters Patent of the United States is:

1. A die for extrusion-molding, comprising:
   a die main body comprising
      a molding groove part provided with one or more molding grooves and
      a material supplying part for supplying a material to said molding groove part, wherein said molding groove part and said material supplying part both have a substantially planar configuration, said molding groove part is smaller in size than said material supplying part and is attached to a center portion of said material supplying part; and
   an outer frame adapted to affix said die main body to a front end of an extrusion molding apparatus, said outer frame comprising:

a die holding part having first and second surfaces and an opening extended therebetween, the opening is sized to receive said molding groove part, and the thickness of the die holding part is the distance between the first and the second surfaces so that when the thickness of said molding groove part is X, the thickness of said material supplying part is Y, and the thickness of the die holding part of said outer frame is Z, thicknesses X, Y and Z satisfy the following inequalities (1) to (5):

$$3 \text{ (mm)} \leq X \leq 4 \text{ (mm)} \tag{1},$$

$$5 \text{ (mm)} \leq Y \leq 10 \text{ (mm)} \tag{2},$$

$$3.5 \text{ (mm)} \leq Z \leq 8.5 \text{ (mm)} \tag{3},$$

$$0.8 < Y/X < 2.5 \tag{4, and}$$

$$1 < Z/X < 2 \tag{5},$$

wherein said die is made of tool steel, tool steel for hot working, or hard metal, and said die is used to manufacture a porous ceramic member having a plurality of cells placed in parallel with one another in the longitudinal direction of said porous ceramic member with a partition wall between adjacent cells by degreasing and firing a ceramic mold body extrusion molded by said die, said porous ceramic member being made of silicon carbide or silicon carbide-silicon composite.

2. The die for extrusion-molding according to claim 1, wherein a molded body extruded through said die has a cross-sectional area perpendicular to a longitudinal direction of said molded body of at least about 900 mm² and at most about 1600 mm².

3. The die for extrusion-molding according to claim 1, wherein the distance between the inner walls of said molding groove is at least about 0.20 mm and at most about 0.40 mm.

4. The die for extrusion-molding according to claim 1, wherein the number of grooves provided in an area of 100 mm² on a surface of said molding groove part is at least about 3 grooves and at most about 6 grooves.

5. A method for manufacturing a porous ceramic member, comprising:

molding a ceramic material to form a ceramic molded body using a die, wherein the ceramic molded body comprises a large number of cells placed in parallel with one another in a longitudinal direction of said molded body with a partition wall between adjacent cells;

drying said ceramic molded body; and degreasing and firing said ceramic molded body to obtain a porous ceramic member having a plurality of cells placed in parallel with one another in the longitudinal direction of said porous ceramic member with a partition wall between adjacent cells, said porous ceramic member being made of silicon carbide or silicon carbide-silicon composite, wherein said die comprises:

a die main body comprising a molding groove part provided with one or more molding grooves and a material supplying part for supplying a material to said molding groove part, wherein said molding groove part and said material supplying part both have a substantially planar configuration, said molding groove part is smaller in size than said material supplying part and is attached to a center portion of said material supplying part; and an outer frame adapted to affix said die main body to a front end of an extrusion molding apparatus, said outer frame comprising:

a die holding part having first and second surfaces and an opening extended therebetween, the opening is sized to receive said molding groove part, and the thickness of the die holding part is the distance between the first and the second surfaces so that when the thickness of said molding groove part is X, the thickness of said material supplying part is Y, and the thickness of the die holding part of said outer frame is Z, thicknesses X, Y and Z satisfy the following inequalities (1) to (5):

$$3 \text{ (mm)} \leq X \leq 4 \text{ (mm)} \tag{1},$$

$$5 \text{ (mm)} \leq Y \leq 10 \text{ (mm)} \tag{2},$$

$$3.5 \text{ (mm)} \leq Z \leq 8.5 \text{ (mm)} \tag{3},$$

$$0.8 < Y/X < 2.5 \tag{4, and}$$

$$1 < Z/X < 2 \tag{5},$$

wherein said die is made of tool steel, tool steel for hot-working, or hard metal.

6. The method for manufacturing a porous ceramic member according to claim 5, wherein a molded body extruded through said die has a cross-sectional area perpendicular to a longitudinal direction of said molded body of at least about 900 mm² and at most about 1600 mm².

7. The method for manufacturing a porous ceramic member according to claim 5, wherein the distance between the inner walls of said molding groove is at least about 0.20 mm and at most about 0.40 mm.

8. The method for manufacturing a porous ceramic member according to claim 5, wherein the number of grooves provided in an area of 100 mm² on a surface of said molding groove part is at least about 3 grooves and at most about 6 grooves.

9. A die for extrusion-molding, comprising:

a die main body comprising a molding groove part provided with one or more molding grooves and a material supplying part for supplying a material to said molding groove part, wherein said molding groove part and said material supplying part both have a substantially planar configuration, said molding groove part is smaller in size than said material supplying part and is attached to a center portion of said material supplying part; and an outer frame adapted to affix said die main body to a front end of an extrusion molding apparatus, said outer frame comprising:

a die holding part having first and second surfaces and an opening extended therebetween, the opening is sized to receive said molding groove part, and the thickness of the die holding part is the distance between the first and the second surfaces so that when the thickness of said molding groove part is X, the thickness of said material supplying part is Y, and the thickness of the die holding part of said outer frame is Z, thicknesses X, Y and Z satisfy the following inequalities (1) to (5):

$$3 \text{ (mm)} \leq X \leq 6 \text{ (mm)} \tag{1},$$

$$5 \text{ (mm)} \leq Y \leq 7 \text{ (mm)} \tag{2},$$

$$3.5 \text{ (mm)} \leq Z \leq 8.5 \text{ (mm)} \tag{3},$$

$$0.8 < Y/X < 2.5 \qquad (4), \text{ and}$$

$$1 < Z/X < 2 \qquad (5),$$

wherein said die is made of tool steel, tool steel for hot working, or hard metal, and said die is used to manufacture a porous ceramic member having a plurality of cells placed in parallel with one another in the longitudinal direction of said porous ceramic member with a partition wall between adjacent cells by degreasing and firing a ceramic mold body extrusion molded by said die, said porous ceramic member being made of silicon carbide or silicon carbide-silicon composite.

10. The die for extrusion-molding according to claim 9, wherein a molded body extruded through said die has a cross-sectional area perpendicular to a longitudinal direction of said molded body of at least about 900 mm² and at most about 1600 mm².

11. The die for extrusion-molding according to claim 9, wherein the distance between the inner walls of said molding groove is at least about 0.20 mm and at most about 0.40 mm.

12. The die for extrusion-molding according to claim 9, wherein the number of grooves provided in an area of 100 mm² on a surface of said molding groove part is at least about 3 grooves and at most about 6 grooves.

13. A method for manufacturing a porous ceramic member, comprising:
   molding a ceramic material to form a ceramic molded body using a die, wherein the ceramic molded body comprises a large number of cells placed in parallel with one another in a longitudinal direction of said molded body with a partition wall between adjacent cells;
   drying said ceramic molded body; and
   degreasing and firing said ceramic molded body to obtain a porous ceramic member having a plurality of cells placed in parallel with one another in the longitudinal direction of said porous ceramic member with a partition wall between adjacent cells, said porous ceramic member being made of silicon carbide or silicon carbide-silicon composite,
   wherein said die comprises:
   a die main body comprising
      a molding groove part provided with one or more molding grooves and
      a material supplying part for supplying a material to said molding groove part, wherein said molding groove part and said material supplying part both have a substantially planar configuration, said molding groove part is smaller in size than said material supplying part and is attached to a center portion of said material supplying part; and
   an outer frame adapted to affix said die main body to a front end of an extrusion molding apparatus, said outer frame comprising:
   a die holding part having first and second surfaces and an opening extended therebetween, the opening is sized to receive said molding groove part, and the thickness of the die holding part is the distance between the first and the second surfaces so that when the thickness of said molding groove part is X, the thickness of said material supplying part is Y, and the thickness of the die holding part of said outer frame is Z, thicknesses X, Y and Z satisfy the following inequalities (1) to (5):

$$3 \text{ (mm)} \leq X \leq 6 \text{ (mm)} \qquad (1),$$

$$5 \text{ (mm)} \leq Y \leq 7 \text{ (mm)} \qquad (2),$$

$$3.5 \text{ (mm)} \leq Z \leq 8.5 \text{ (mm)} \qquad (3),$$

$$0.8 < Y/X < 2.5 \qquad (4), \text{ and}$$

$$1 < Z/X < 2 \qquad (5),$$

wherein said die is made of tool steel, tool steel for hot-working, or hard metal.

14. The method for manufacturing a porous ceramic member according to claim 13, wherein a molded body extruded through said die has a cross-sectional area perpendicular to a longitudinal direction of said molded body of at least about 900 mm² and at most about 1600 mm².

15. The method for manufacturing a porous ceramic member according to claim 13, wherein the distance between the inner walls of said molding groove is at least about 0.20 mm and at most about 0.40 mm.

16. The method for manufacturing a porous ceramic member according to claim 13, wherein the number of grooves provided in an area of 100 mm² on a surface of said molding groove part is at least about 3 grooves and at most about 6 grooves.

* * * * *